United States Patent [19]

Suda

[11] Patent Number: 5,440,367
[45] Date of Patent: Aug. 8, 1995

[54] FOCUS DETECTING APPARATUS PROVIDED WITH A PLURALITY OF DETECTION FIELDS

[75] Inventor: Yasuo Suda, Yokohama, Japan

[73] Assignee: Canon Kabushiki Kaisha, Tokyo, Japan

[21] Appl. No.: 197,444

[22] Filed: Feb. 16, 1994

Related U.S. Application Data

[63] Continuation of Ser. No. 788,286, Nov. 5, 1991, abandoned.

[30] Foreign Application Priority Data

| Nov. 7, 1990 [JP] | Japan | 2-302265 |
| Nov. 7, 1990 [JP] | Japan | 2-302266 |
| Nov. 7, 1990 [JP] | Japan | 2-302267 |

[51] Int. Cl.⁶ .......................................... G03B 13/36
[52] U.S. Cl. .................................................. 354/402
[58] Field of Search ............... 354/402, 404, 406, 407, 354/408

[56] References Cited

U.S. PATENT DOCUMENTS

| 4,555,169 | 11/1985 | Suda et al. | 354/407 |
| 4,618,236 | 10/1986 | Akashi et al. | 354/406 |
| 4,634,255 | 1/1987 | Suda et al. | 354/406 |
| 4,643,557 | 2/1987 | Ishizaki et al. | 354/406 |
| 4,670,645 | 6/1987 | Ohtaka et al. | 250/201 |
| 4,688,920 | 8/1987 | Suda et al. | 354/406 |
| 4,709,138 | 11/1987 | Suda et al. | 250/201 |
| 4,716,282 | 12/1987 | Akashi et al. | 250/201 |
| 4,728,785 | 3/1988 | Ohnuki et al. | 250/201 |
| 4,739,157 | 4/1988 | Akashi et al. | 250/201 |
| 4,774,539 | 9/1988 | Suda et al. | 354/406 |
| 4,792,668 | 12/1988 | Akashi et al. | 250/201 |
| 4,792,669 | 12/1988 | Ohnuki et al. | 250/201 |
| 4,800,410 | 1/1989 | Akashi et al. | 354/408 |
| 4,812,869 | 3/1989 | Akashi et al. | 354/408 |
| 4,825,239 | 4/1989 | Suda et al. | 354/402 |
| 4,833,313 | 5/1989 | Akashi et al. | 250/201 |
| 4,855,777 | 8/1989 | Suda et al. | 354/402 |
| 4,859,842 | 8/1989 | Suda et al. | 250/201 |
| 4,878,078 | 10/1989 | Koyama et al. | 354/402 |
| 4,908,645 | 3/1990 | Higashihara et al. | 354/402 |
| 4,954,701 | 9/1990 | Suzuki et al. | 250/201.8 |
| 4,959,677 | 9/1990 | Suda et al. | 354/402 |
| 4,963,912 | 10/1990 | Suda et al. | 354/404 |
| 4,992,817 | 2/1991 | Aoyama et al. | 354/403 |
| 4,992,819 | 2/1991 | Ohtaka et al. | 354/408 |
| 5,005,041 | 4/1991 | Suda et al. | 354/407 |
| 5,091,742 | 2/1992 | Fukahori et al. | 354/402 |

FOREIGN PATENT DOCUMENTS

| 58-142306 | 8/1983 | Japan . |
| 59-107313 | 6/1984 | Japan . |
| 60-101513 | 6/1985 | Japan . |
| 61-160824 | 7/1986 | Japan . |
| 62-33564 | 7/1987 | Japan . |
| 1120518 | 5/1989 | Japan . |
| 1154011 | 6/1989 | Japan . |

Primary Examiner—Russell E. Adams
Attorney, Agent, or Firm—Fitzpatrick, Cella, Harper & Scinto

[57] ABSTRACT

A focus detecting apparatus is provided with optical means for forming, from a light beam passed through an objective lens, distributions of intensity of light whose relative position varies in conformity with the focus adjusted state of the objective lens, light receiving means for receiving the distributions of intensity of light and forming a signal indicative of the focus adjusted state of the objective lens, and masking means for regulating the light beam passed through the objective lens to effect detection relative to a desirable position in a scene which is not restricted to a predetermined position.

13 Claims, 12 Drawing Sheets

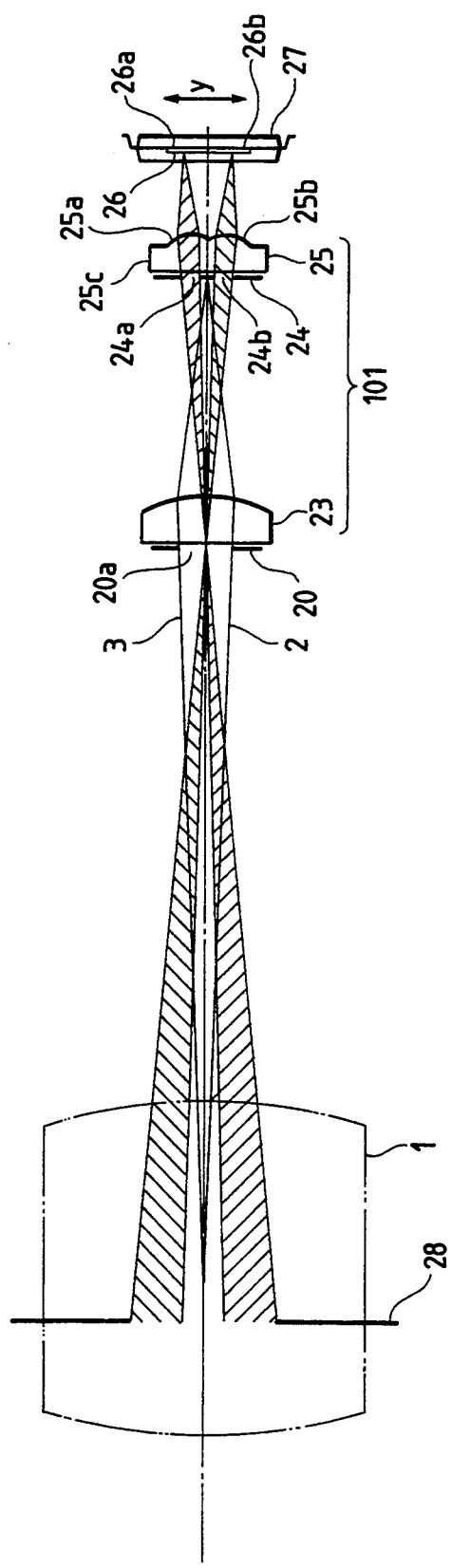
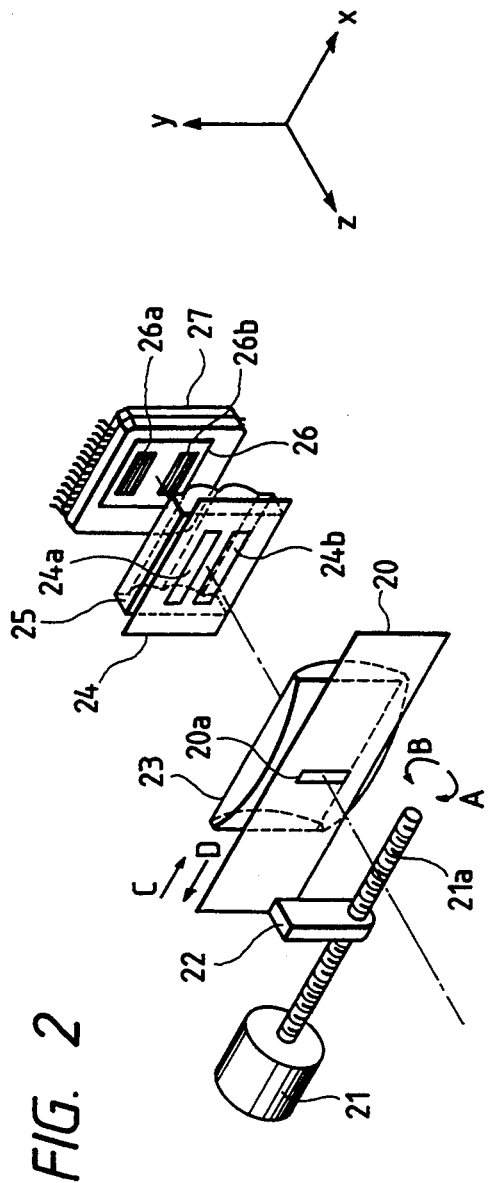

FIG. 10
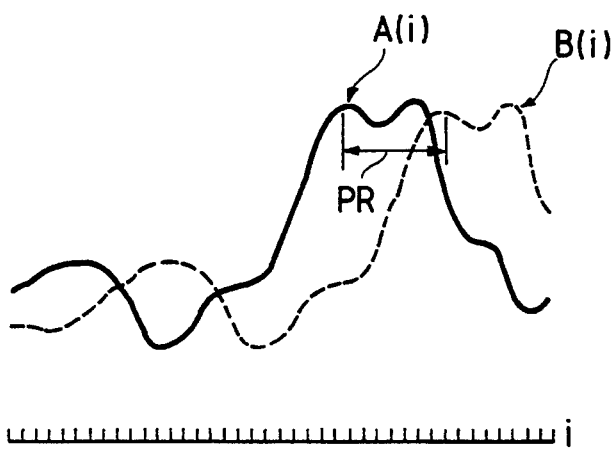
FIG. 11
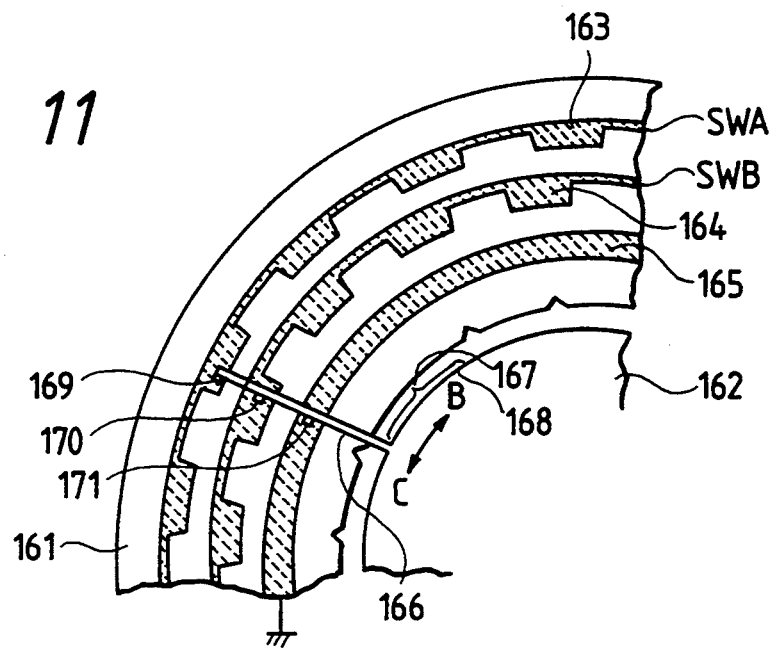
FIG. 12
UP MODE
|     | a | b | c | d | e(a) |
|-----|---|---|---|---|------|
| SWA | L | L | H | H | L    |
| SWB | L | H | H | L | L    |
FIG. 13
DOWN MODE
|     | e(a) | d | c | b | a |
|-----|------|---|---|---|---|
| SWA | L    | H | H | L | L |
| SWB | L    | L | H | H | L |

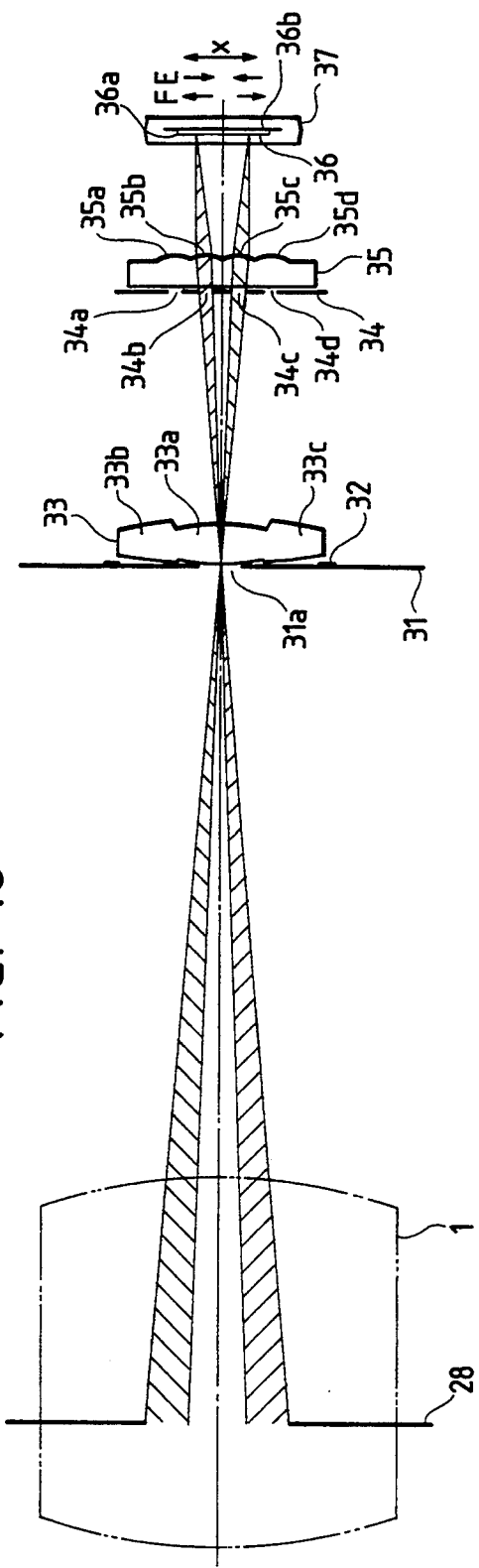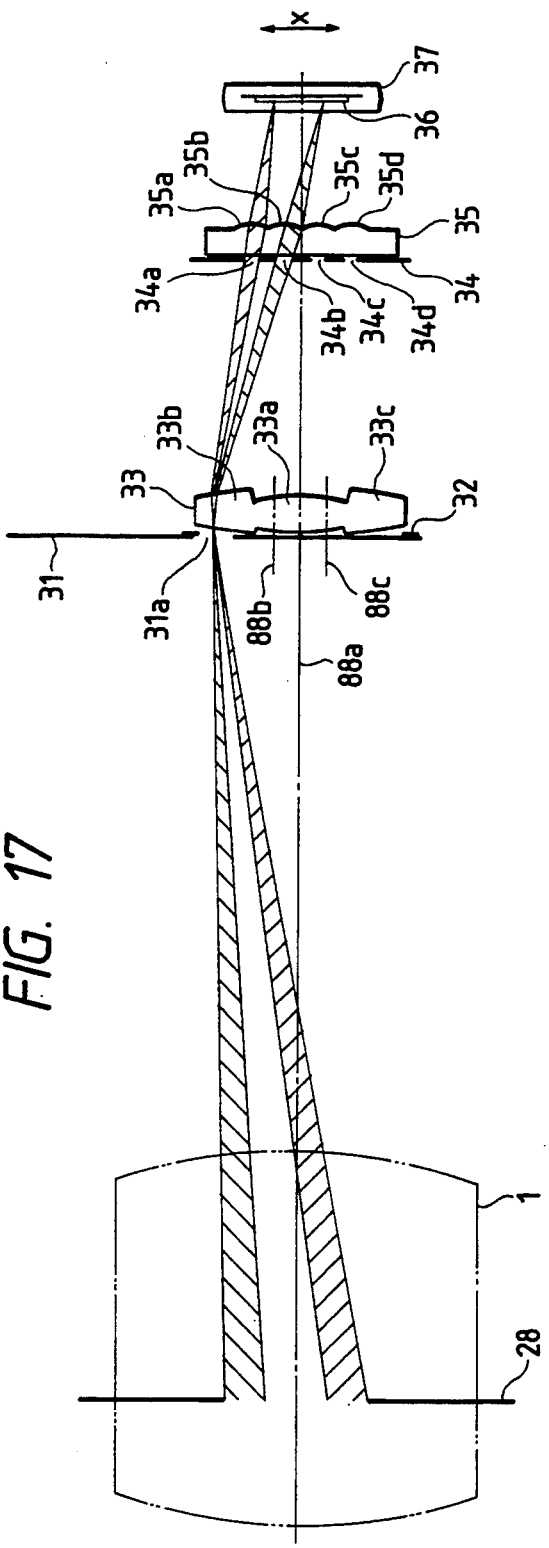

FOCUS DETECTING APPARATUS PROVIDED WITH A PLURALITY OF DETECTION FIELDS

This application is a continuation of application Ser. No. 07/788,286 filed Nov. 5, 1991, now abandoned.

BACKGROUND OF THE INVENTION

1. Field of the Invention

This invention relates to a focus detecting apparatus suitable for a photographic camera, a video camera or the like. The invention particularly relates to focus detecting apparatus suitable for effecting focus detection with a plurality of distance measuring points or any distance measuring point in a photographing picture plane as a subject. This is achieved the utilization of the so-called image deviation system in which the exit pupil of an objective lens is divided into a plurality of areas and a light beam passing through each of said areas is used to form distributions of quantity of light regarding a plurality of object images and the relative positional relation between these distributions of quantity of light is found to thereby detect the in-focus state of the objective lens.

2. Related Background Art

Light receiving type focus detection systems of relatively high detection accuracy utilizing a light beam passed through an objective lens include a system called the image deviation system.

Among focus detecting apparatuses utilizing this image deviation system, a focus detecting apparatus designed to effect focus detection with respect to the central portion of a photographing range and the other areas is proposed, for example, by Japanese Laid-Open Patent Application 1-120518.

FIGS. 20–22 of the accompanying drawings are schematic views of some portions of the focus detecting apparatus proposed by the above-mentioned publication.

FIG. 20 shows a perspective view, FIG. 21 shows a vertical cross-sectional shape, and FIG. 22 shows the positional relation between the picture element array of a photoelectric conversion device comprising a single chip and the distribution of quantity of light.

The reference numeral 42 designates a multi-opening field mask having juxtaposed rectangular openings each having longer sides in the lateral direction so viewed in FIG. 20, and disposed near the predetermined imaging plane of an objective lens (not shown). The reference numeral 43 denotes a filter for intercepting lights of longer wavelength than near-infrared light, and the reference numeral 50 designates an accumulation type field lens disposed somewhat off the predetermined imaging plane of the objective lens. The accumulation type field lens 50 comprises lens portions 50a, 50b, 50c, 50d, 50e, 50f and 50g differing in optical action from one another as will be described later, and these portions are formed by changing one or both of the lens thickness and the radius of curvature of the lens surface. In lieu of the accumulation type field lens 50, use can be made of a combination of an optical system such as a Fresnel lens comprising different prisms juxtaposed relative to the openings in the multi-opening field mask and a bi-convex lens.

The reference numeral 51 denotes a convex lens, and the reference numeral 53 designates a two-image forming lens. These lenses together constitute a re-imaging lens unit with a two-opening stop 52 interposed therebetween, and the convex lens 51 converts incident light into a nearly parallel state (the optical action of this lens is described in Japanese Patent Publication No. 62-33564), and the two-image forming lens 53 comprising two convex lenses 53a and 53b juxtaposed and cemented together forms two secondary images of the object image formed by the objective lens. The aforementioned two-opening stop 52 has vertically long elliptical openings 52a and 52b juxtaposed in the lateral direction as viewed in FIG. 20.

The reference numeral 54 denotes a concave lens for correcting curvature of image field which is disposed on a transparent plastic package 56 containing a photoelectric conversion device 55 (FIGS. 21 and 22) therein. The accumulation type field lens 50, the convex lens 51 of the re-imaging lens unit and the concave lens 54 are shaped vertically long, but all of them are rotation-symmetrical spherical lens systems.

Light beams passed through the openings 42a to 42g in the multi-opening field mask 42 are transmitted through the lens portions 50a, 50b, 50c, 50d, 50e, 50f and 50g, respectively, of the accumulation type field lens 50, as shown in FIG. 20, and form the secondary image of the object image on the photoelectric conversion device 55. FIG. 21 shows this state, and 60a and 60b, . . . , 60m and 60n, and 62a and 62b are sets of picture element arrays (line sensors) each comprising a number of picture elements, and on 62a and 62b, there is formed a filter having a band-pass characteristic substantially equal to the wavelength of emitted light from an object illuminating device which will be described later. The opening images 61a, . . . , 61n of the openings 42a, . . . , 42g in the multi-opening field mask 42 are projected correspondingly to these picture element arrays, and the secondary images of an object are formed therein. At that time, the refractive powers of the optical systems relaying the mask 42 and the device 55, particularly the lens portions of the accumulation type field lens 50 and the re-imaging unit, are adjusted in accordance with the width of each opening in the multi-opening field mask 42 and the width of light intercepting zones 42h, . . . , 42m between the openings, and the width of the picture element arrays on the photoelectric conversion device 55 and the pitch of the picture element arrays and therefore, the light intercapting zones 42h, . . . , 42m of the multi-opening field mask 42 prevent part of a light beam having emerged from a predetermined opening from entering the other picture element arrays than the picture element array (line sensor) corresponding at one to one to said opening. Also, two field mask images are formed in laterally juxtaposed relationship with each other per one opening in the multi-opening field mask 42 by the actions of the openings 52a, 52b and the lens portions 53a, 53b, and in the relation to the position of the object image relative to the predetermined imaging plane, the secondary images of the object therein both move in the direction of arrow A and the direction of arrow B. Accordingly, each set of picture element arrays detects the relative spacing between the distributions of quantity of light regarding secondary images forming a pair on the basis of the photoelectric conversion output and thus, the in-focus state of the objective lens can be known with respect to distance measuring positions at a plurality of points.

In the prior-art focus detecting apparatus designed to effect distance measurement in a plurality of areas, a pair of picture element arrays (line sensors) are required for one distance measuring field. Therefore, an increase in the number of distance measuring fields requires a corresponding increase in the number of picture element arrays, and this has led to the tendency of the chip size of a photoelectric conversion element such as a CCD toward bulkiness. Generally, in the manufacture of a CCD or the like, an increased area thereof means greater technical difficulty.

U.S. application Ser. No. 281,326 (Japanese Laid-Open Patent Application No. 1-154011) discloses a focus detecting apparatus having a plurality of fields.

SUMMARY OF THE INVENTION

It is an object of the present invention to provide an apparatus which can accomplish focus detection with respect to a plurality of detection fields and in which a sensor device can be made relatively compact.

It is another object of the present invention to appropriately set, in a focus detecting apparatus utilizing the image deviation system, the construction of optical means for forming on the surface of light receiving means a distribution of intensity of light regarding an object image formed by an objective lens and the construction of mask means for specifying a desirable distance measuring field, thereby effecting focus detection highly accurately in a plurality of distance measuring fields by a simple construction, particularly by a pair of picture element arrays (one-dimensionally arranged sensors).

It is still another object of the present invention to provide an apparatus designed such that by optical means disposed on the image plane side of an objective lens, a plurality of distributions of quantity of light regarding an object image are formed on the surface of light receiving means through mask means by the use of light beams passed through the different areas of the exit pupil of the objective lens, and when the relative positional relation between the plurality of distributions of quantity of light is found by the light receiving means and the in-focus state of said objective lens is found by the use of an output signal from the light receiving means, the optical means has the optical action that in a predetermined plane, a light beam passed through a desirable area not limited to a particular position enters the same area on the surface of the light receiving means, and the mask means selectively directs a light beam forming a particular area of an object image to the light receiving means.

Further, a block which provides the standard of the apparatus according to the present invention is such that the light receiving means has a pair of linear sensors, the optical means differs in refractive power between the direction of arrangement of the elements of the sensors and a direction orthogonal thereto and the mask means is movable in the direction of arrangement of the picture elements of the linear sensors or a direction orthogonal thereto.

BRIEF DESCRIPTION OF THE DRAWINGS

FIG. 1 is a vertical cross-sectional view of a first embodiment of the present invention.

FIG. 2 is a perspective view of portions of the FIG. 1 embodiment.

FIG. 10 illustrates an output signal from light receiving means according to the present invention.

FIGS. 11, 12 and 13 are a switch construction view of a setting dial, an operation diagram of the setting dial and a state diagram of switches, respectively, when the present invention is applied to a single-lens reflex camera.

FIGS. 16 and 17 are transverse cross-sectional views of the FIG. 15 embodiment.

DESCRIPTION OF THE PREFERRED EMBODIMENTS

Figure 3:
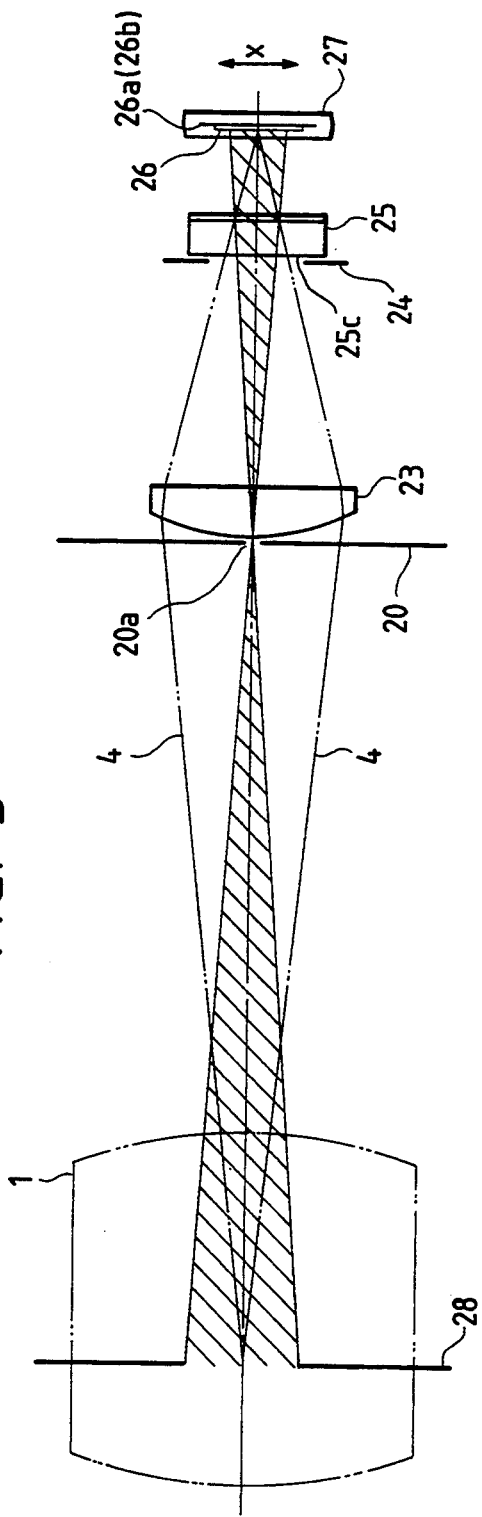
FIGS. 3 and 4 are transverse cross sectional views of the FIG. 1 embodiment.
Figure 4:
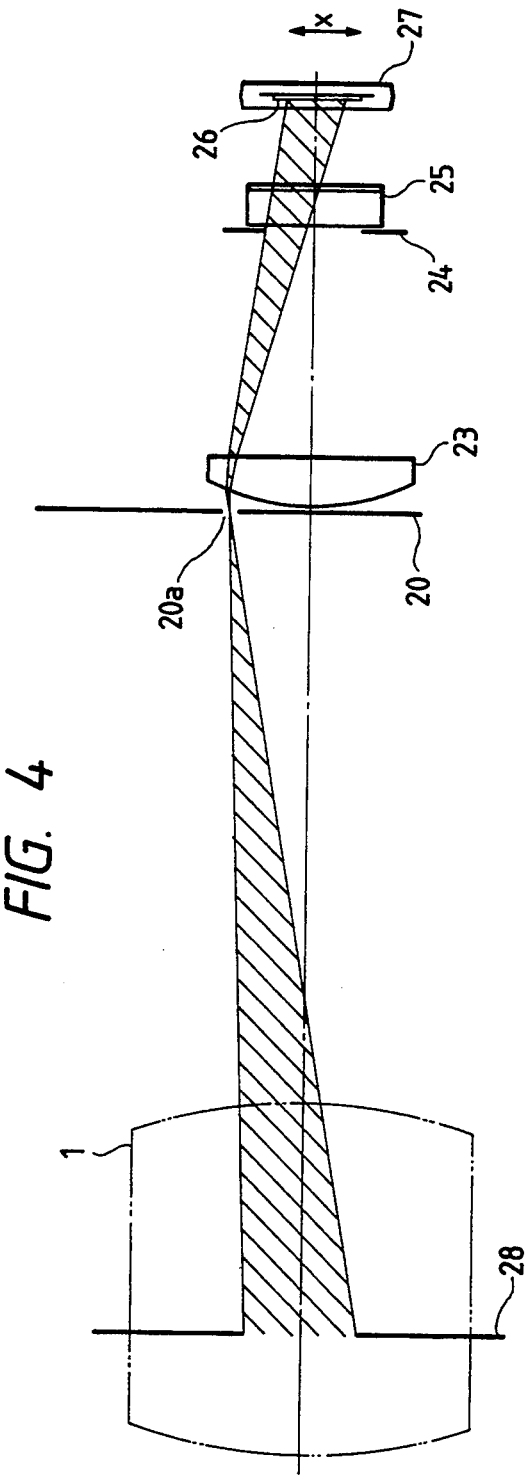

FIG. 1 shows an optical cross-section (a vertical cross-section) of a first embodiment of the present invention, and FIG. 2 shows a perspective view of the essential portions of the FIG. 1 embodiment. FIGS. 3 and 4 both show transverse cross-sections of the first embodiment of the present invention corresponding to FIG. 1.

In the figures, the reference numeral 1 designates an objective lens (a photo-taking lens), and the reference numeral 28 denotes the exit pupil of the objective lens 1. The reference numeral 20 designates a movable mask having a slit-like (rectangular) opening 20a extending in a y direction and disposed near the predetermined imaging plane of the objective lens 1. One end portion of the movable mask 20 is secured by a support bar 22. The support bar 22 is formed with a female thread, which is engaged by the lead screw 21a of a stepping motor 21. Accordingly, the movable mask 20 is parallel-moved in a x direction indicated by arrow C (or D) by the driving of the stepping motor 21 in the direction of arrow A (or B).

The movable mask 20, the support bar 22 and the stepping motor 21 together constitute an element of mask means. The reference numeral 23 denotes a toric lens as a first optical member disposed immediately behind the movable mask 20. The toric lens 23 has different refractive powers in the x direction and y direction, that is, it has different imaging actions in the vertical cross-section of FIG. 1 (in yz plane) and in the transverse cross-section of FIG. 3 (in xz plane).

The reference numeral 27 designates light receiving means comprised of a package of transparent resin or the like in which a photoelectric conversion element 26 is enveloped. The photoelectric conversion element 26 comprises a pair of linear sensors (one-dimensionally arranged sensors) 26a and 26b each comprising a plurality of picture elements extending in the x direction and juxtaposed in the y direction. The reference numeral 24 denotes a mask having two rectangular openings 24a and 24b extending long in x direction and juxtaposed in the y direction. The mask 24 determines the shape when the exit pupil 28 of the objective lens 1 is divided into two areas in the y direction, as indicated by hatching in FIG. 1. It is to be understood that the dimension of each of these rectangular openings in the direction of the shorter sides thereof (y direction) is set in conformity with the F number (F No.) of the objective lens used, particularly in the case of a photographic lens, the fully open F number (F No.) thereof, so that an effective light beam for focus detection may not be eclipsed.

The reference numeral 25 designates a cylindrical lens as a second optical member disposed behind the mask 24. The entrance surface 25c of the cylindrical lens 25 comprises a flat surface provided with an infrared light cut coating, and the exit surfaces 25a and 25b thereof each comprise a cylindrical surface having refractive power in the y direction. Light beams passed through the two openings 24a and 24b in the mask 24 enter the two cylindrical surfaces 25a and 25b, respectively. The toric lens 23, the mask 24 and the cylindrical lens 25 together constitute an element of optical means 101.

In the present embodiment, the toric lens 23 makes the exit pupil 28 of the objective lens 1 and the mask 24 substantially conjugate with each other in the vertical cross-section shown in FIG. 1 (yz plane). The cylindrical lens 25 makes the predetermined imaging plane of the objective lens 1 and the surface of the linear sensors 26a and 26b of the photoelectric conversion element 26 substantially conjugate with each other.

That is, it makes the refractive power of the toric lens 23 so negligible that the toric lens 23 is disposed near the predetermined imaging plane. Accordingly, the cylindrical lens 25 forms on the surfaces of the linear sensors 26a and 26b the secondary image (optical images) of the object image which is formed in the opening 20a in the movable mask 20 in the yz plane.

Since the cylindrical lens 25 in the present embodiment comprises two cylindrical surfaces 25a and 25b in the yz plane, a pair of secondary images are formed on the surface of the photoelectric conversion element 26, and these light beams each converge in the vertical cross-section (in yz plane).

In the transverse cross-section of FIG. 3 (in xz plane), as indicated by a phantom light ray 4, the toric lens 23 makes the exit pupil 28 of the objective lens 1 and the surfaces of the linear sensors 26a and 26b of the photoelectric conversion element 26 substantially conjugate with each other. The cylindrical lens 25 does not have refractive power in this xz plane, but acts as a mere parallel flat plate. Accordingly, in this xz plane, the object image is not projected onto the surface of the photoelectric conversion element 26, and light beams passing through any areas of the toric lens 23 converge and enter a common area on the surface of the photoelectric conversion element 26.

FIG. 4 is an illustration showing the optical path of a light beam passing through another area of the toric lens 23, as compared with the FIG. 3. FIG. 4 shows the optical path of a light beam forming the off-axis object image by the objective lens 1, and shows a state in which the opening 20a in the movable mask 20, which is positioned in the central portion in FIG. 3, has moved to the marginal portion. As shown in FIG. 4, the light beam from the objective lens 1, which has entered the opening 20a in the movable mask 20, is refracted by the toric lens 23, and converges and enters the same area on the surface of the photoelectric conversion element 26 as the area on the surface of the photoelectric conversion element 26 which is shown in FIG. 3.

Figure 5:
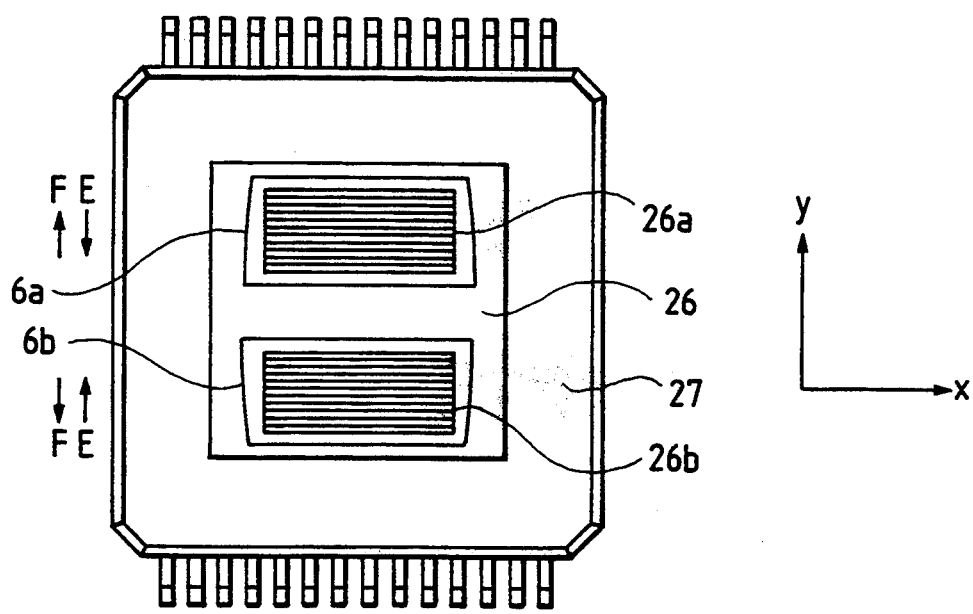
FIGS. 5 and 6 are illustrations of portions of the FIG. 1 embodiment.

FIG. 5 depicts the planar shape of light receiving means 27 in the present embodiment. In FIG. 5, the reference characters 6a and 6b designate optical images formed by optical means, and distributions of intensity of light regarding the object image are formed in these optical images. The reference characters 26a and 26b denote linear sensors each comprising a plurality of rectangular elements arranged in the y direction and set so as to be within the pair of optical images 6a and 6b, respectively. The distributions of intensity of light regarding the object image are photoelectrically converted by the linear sensors 26a and 26b. The direction of the longer sides (x direction) of each of the picture elements forming the linear sensors 26a and 26b is designed so as to be substantially conjugate with the exit pupil 28 of the objective lens 1, as shown in FIG. 3. Like this, the linear sensors 26a and 26b are set so as to be as long as possible in x direction within a range in which there is no eclipse, whereby a greater quantity of light can be received.

Figure 6:
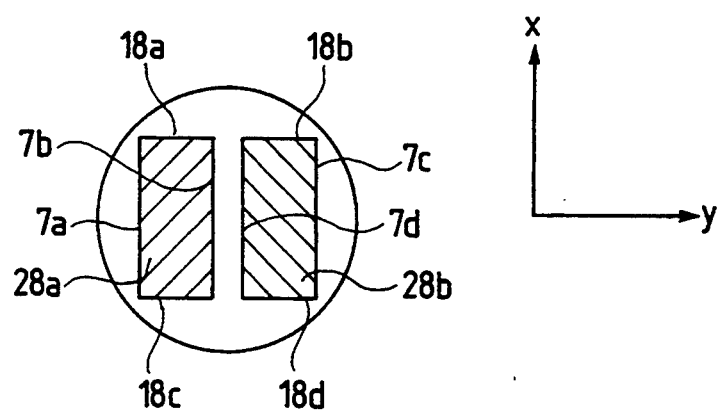

FIG. 6 is an illustration showing the divided state of the exit pupil 28 of the objective lens 1. Rectangular areas 28a and 28b indicated by hatching in FIG. 6 are areas through which light beams used in focus detection pass. Of the boundary lines defining these areas 28a and 28b, boundary lines 7a, 7b, 7c and 7d are determined by the reverse projection of the mask 24 by the toric lens 23, and boundary lines 18a, 18b, 18c and 18d are determined by the reverse projection of the mask 24 by the toric lens 23 and the cylindrical lens 25.

The distributions of intensity of light regarding the two object images projected onto the surface of the photoelectric conversion element 26 in this manner are ones obtained by dividing the exit pupil 28 and therefore, move in the direction of arrow F, for example, in the front focus state, and in the direction of arrow E in the rear focus state, in conformity with the imaging state of the objective lens 1.

In the present embodiment, the amount of movement at this time is detected and compared with a reference amount, thereby calculating and finding the defocus amount of the objective lens 1.

Particularly in the present embodiment, to whatever position in the x direction the opening 20a in the movable mask 20 may be moved, the projected position of the optical image in xz cross-section does not change and therefore, focus detection at the position of the opening 20a in the movable mask 20, i.e., multi-point distance measurement, becomes possible simply by providing a pair of linear sensors. Also, the distance measuring field is determined by the dimensions of the opening 20a in the movable mask 20 with respect to the direction of the shorter sides (x direction), and by the reversely projected dimensions of the linear sensors 26a and 26b of the photoelectric conversion element 26 with respect to the direction of the longer sides (y direction).

Figure 7:
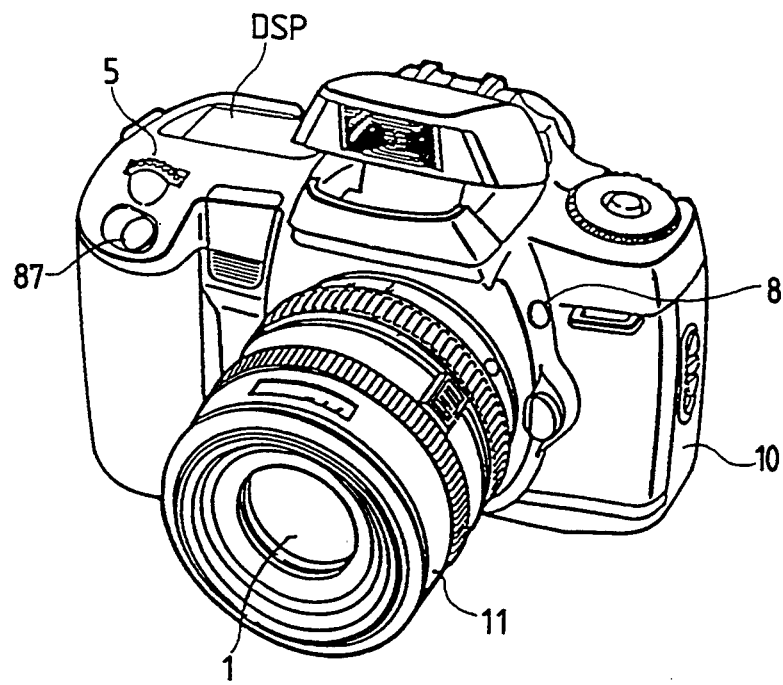
FIGS. 7, 8 and 9 are a perspective view, a cross-sectional view and a signal processing circuit diagram, respectively, when the first embodiment of the present invention is applied to a single-lens reflex camera.
Figure 8:
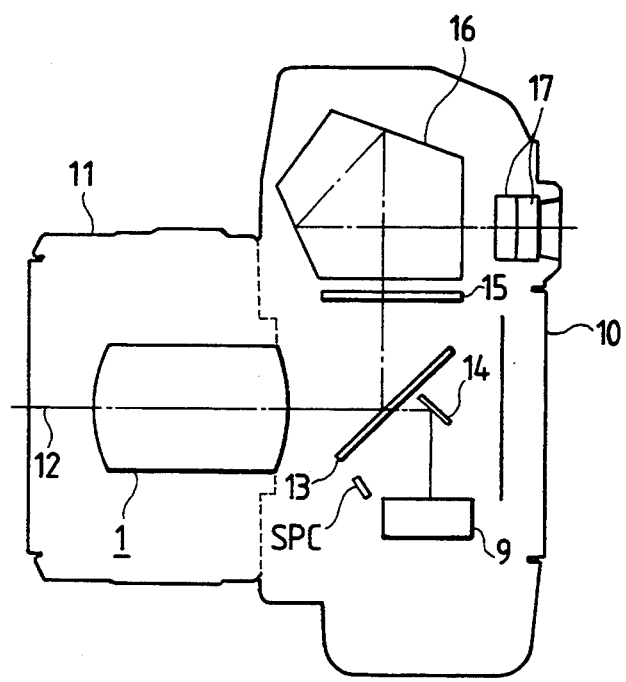

FIG. 7 is a perspective view showing the whole of a single-lens reflex camera to which the focus detecting apparatus based on the first embodiment of the present invention is applied, and FIG. 8 is a cross-sectional view of the optical system thereof.

In FIG. 7, the reference numeral 87 designates a release button, the reference numeral 5 denotes a setting dial operable by the index finger of the right hand, DSP designates a liquid crystal display device, and the reference numeral 8 denotes a distance measuring field selection mode button operable by the thumb of the left hand.

In FIG. 8, the reference numeral 9 designates focus detecting means comprising the elements such as the movable mask 20 and so on of FIG. 2 made into a unit.

The reference numeral 10 denotes a camera body, the reference numeral 11 designates a lens barrel holding the objective lens 1 for movement in the direction of the optic axis 12, and the reference numeral 13 denotes a main mirror cooperating with a sub-mirror 14 to separate the object light passed through the objective lens 1 into a finder system and the focus detecting means 9. The reference numeral 15 designates a focusing screen, the reference numeral 16 denotes a pentagonal roof type prism, and the reference numeral 17 designates an eyepiece. These together constitute the finder system.

Figure 9:
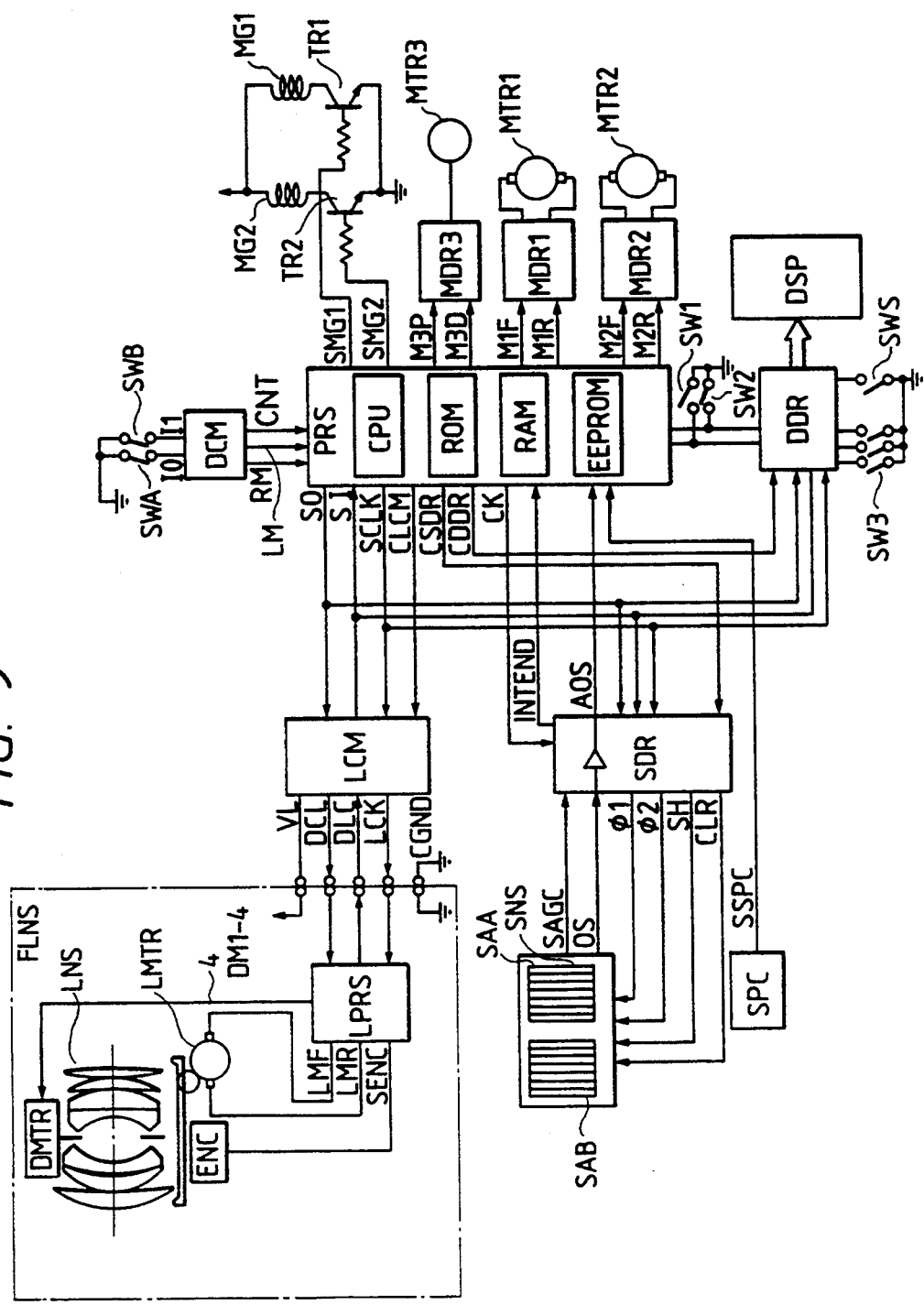

FIG. 9 is a circuit diagram showing an embodiment of a camera provided with the automatic focus apparatus according to the present invention.

In FIG. 9, PRS denotes the controller of the camera which is, for example, a 1-chip microcomputer having therein a CPU (central processing unit), a ROM, a RAM, an EEPROM (electrically erasable programmable ROM) and an A/D converting function and which performs the operations of the camera such as the automatic exposure control function, the automatic focus detecting function, the winding and rewinding of film. The EEPROM is a kind of non-volatile memory in which various kinds of adjustment data are written in the process.

The controller PRS communicates with its surrounding circuits and the lens by the use of communication signals SO, SI and SCLK and controls the operations of the circuits and the lens.

SO is a data signal output from the controller PRS, SI is a data signal input to the controller PRS, and SCLK is a synchronizing signal for the signals SO and SI.

LCM designates a lens communication buffer circuit which gives a power source VL for the lens to the lens during the operation of the camera, and provides a buffer for the communication between the camera and the lens when a signal CLCM from the controller PRS is at a high potential level.

When the controller PRS renders the signal CLCM into 'H' and delivers predetermined data from SO in synchronism with the signal SCLK, the circuit LCM outputs buffer signals LCK and DCL for SCLK and SO to the lens through the contact between the camera and the lens. At the same time, the circuit LCM outputs a buffer signal for a signal DLC from the lens to SI, and the controller PRS receives as an input the data of the lens from SI in synchronism with SCLK.

SDR denotes a driving circuit for a linear sensor device SNS (the linear sensors 26a and 26b of FIG. 5) for focus detection. The driving circuit SDR is selected when a signal CSDR is 'H', and is controlled from the controller PRS by the use of SO, SI and SCLK.

A signal CK is a clock for producing clocks $\phi 1$ and $\phi 2$ for driving the CCD, and a signal INTEND is a signal which informs the controller PRS that the accumulating operation has been terminated.

The output signal OS of the linear sensor device SNS is a time-serial image signal synchronized with the clocks $\phi 1$ and $\phi 2$, and is amplified by an amplifying circuit in the driving circuit SDR, whereafter it is output as AOS to the controller PRS. The controller PRS receives AOS as an input from the analog input terminal thereof, and A/D-converts it by the A/D converting function therein, and thereafter stores it into a predetermined address of the RAM.

SAGC, which also is an output signal from the linear sensor device SNS, is the output of a sensor for AGC control in the linear sensor device SNS, and is input to the driving circuit SDR for use for the accumulation control of SNS.

FIG. 10 shows an example of the photoelectric conversion outputs of two images formed on sensor arrays SAA and SAB. The output of SAA is A(i), and the output of SAB is B(i). In this example, the number of the picture elements of the sensor is 40 (i=0, ..., 39).

A signal processing method for detecting an amount of image deviation PR from the image signals A(i) and B(i) is disclosed in Japanese Laid-Open Patent Application No. 58-142306, Japanese Laid-Open Patent Application No. 59-107313, Japanese Laid-Open Patent Application No. 60-101513 or Japanese Laid-Open Patent Application No. 61-160824.

SPC designates a photometry sensor for exposure control which receives light passed through the phototaking lens. The output SSPC of the photometry sensor SPC is input to the analog input terminal of the controller PRS, and is A/D-converted, whereafter it is used for automatic exposure control (AE).

DDR denotes a switch sensing and display circuit. This circuit DDR is selected when a signal CDDR is 'H', and is controlled from the controller PRS by the use of SO, SI and SCLK. That is, it changes over the display on the display member DSP of the camera on the basis of the data sent thereto from the controller PRS, and communicates the ON and OFF states of various operating members such as a release button, not shown (operatively associated with switches SW1 and SW2) and a mode setting button to the controller PRS.

SW1 and SW2 designate switches operatively associated with a release button 87. The switch SW1 is closed by the first-stage depression of the release button 87, and the switch SW2 is closed by the second-stage depression of the release button 87. The controller PRS effects photometry and automatic focus adjustment upon the closing of the switch SW1, and effects exposure and subsequent film winding with the closing of the switch SW2 as a trigger.

The switch SW2 is connected to the "interruption input terminal" of the controller PRS, which is a microcomputer, and even during the execution of the program when the switch SW1 is ON, interruption is applied by the closing of the switch SW2, and immediately control can be shifted to a predetermined interruption program.

DCM denotes a setting dial buffer circuit. This circuit outputs the direction of rotation and the pulse number as signals RM, LM and CNT to the controller PRS from a change in the states of switches SWA and SWB conforming to the operation of the setting dial 5 shown in FIG. 7.

SW3 designates a switch operatively associated with the distance measuring field selection mode button 8 shown in FIG. 7. When the setting dial 5 is operated with the switch SW3 closed, the distance measuring field position changes in response to the operation of the setting dial 5.

MDR1 and MDR2 denote driving circuits for film feeding and shutter spring charge motors MTR1 and MTR2, respectively. These driving circuits execute the forward and reverse rotations of the motors by signals M1F, M1R, M2F and M2R.

MDR3 designates a driving circuit for a stepping motor MTR3 (designated by the reference numeral 21 in FIG. 2) for driving the movable mask 20 of the focus detecting apparatus. This driving circuit MDR3 receives an instruction regarding the number of driving steps by a signal M3P, and an instruction regarding the direction of driving by a signal M3D, and distributes the pulse of each phase of the stepping motor and effects the amplification of an electric current for energization.

MG1 and MG2 denote magnets for starting the movements of the front shutter curtain and the rear shutter curtain, respectively. These magnets are electrically energized by signals SMG1 and SMG2 and amplifying transistors TR1 and TR2, and shutter control is effected by the controller PRS.

The switch sensing and display circuit DDR, the motor driving circuits MDR1, MDR2 and shutter control have no direction relation with the present invention and therefore need not be described in detail.

A signal DCL input to a control circuit LPRS in the lens in synchronism with LCK is command data from the camera to the lens FLNS, and the operation of the lens to the command is predetermined.

The control circuit LPRS analyzes said command in accordance with a predetermined procedure, and effects the operations of focus adjustment and aperture control and the outputting of various parameters (such as fully open F number, focal length and the coefficient of defocus amount vs. amount of axial movement) of the lens from the output DCL.

In the present embodiment, there is shown an example of a generally axially moved single lens, and when a command for focus adjustment is sent from the camera, a motor LMTR for focus adjustment is driven by signals LMF and LMR in accordance with the amount and direction of driving sent at the same time, to thereby move the optical system in the direction of the optical axis thereof and effect focus adjustment. The amount of movement of the optical system is monitored by the pulse signal SENC of an encoder circuit ENC and is counted by a counter in the control circuit LPRS, and at a point of time whereat a predetermined movement has been completed, signals LMF and LMR are rendered into 'L' and the motor LMTR is braked.

When a command for aperture control is sent from the camera, a stepping motor DMTR well known as a motor for aperture driving is driven in accordance with the number of aperture steps sent at the same time. The stepping motor is capable of open control and therefore does not require an encoder for monitoring the operation thereof.

The construction of the switches SWA and SWB (FIG. 9) changed over in operative association with the setting dial 5 shown in FIG. 7 will now be described with reference to FIGS. 11, 12 and 13.

FIG. 11 shows the construction of the switches SWA and SWB provided on the lower portion of the setting dial 5 shown in FIG. 7. In FIG. 11, the reference numeral 161 designates an electrode pattern portion fixed to the camera, and the reference numeral 162 denotes a rotatable portion rotated in operative association with the rotation of the setting dial. The reference numeral 163 designates an electrode provided on the electrode pattern portion 161. The electrode 163, together with brushes 169 and 171, a lever 166 and a common electrode pattern portion 165, which will be described later, constitutes the switch SWA. The reference numeral 164 denotes an electrode provided on the electrode pattern portion 161. Like the electrode 163, the electrode 164, together with brushes 170 and 171, a lever 166 and a common electrode pattern portion 165, constitutes the switch SWB. The reference numeral 165 designates an electrode pattern portion which is grounded and is always in contact with the brush 171. The reference numeral 166 denotes a lever of conductor secured to the rotatable portion 162 and provided with the brushes 169, 170 and 171. The reference numeral 167 designates a recess formed inside the pattern portion 161. The recess 167, together with a leaf spring 168 provided on the rotatable portion 162, constitutes a click.

The change in the states of the switches SWA and SWB when the setting dial 5 is rotated in the direction of arrow B in FIG. 11 from the state as shown in FIG. 11 wherein it is in the position of a click to the next click will now be described with reference to FIG. 12. At first, the setting dial is in the position of the click and therefore, both of the switches SWA and SWB are grounded and become L, L as shown at a in FIG. 12.

When the setting dial 5 is then rotated in the direction of arrow B, the rotatable portion 162 is also rotated in response thereto and the brush 170 comes out of contact with the electrode 164 and therefore, the states of the switches SWA and SWB become L, H as shown at b in FIG. 12. When the setting dial 5 is further rotated in the direction of arrow B, the brush 169 comes out of contact with the brush 163 and the states of the switches SWA and SWB become H, H as shown at c in FIG. 12. When the setting dial 5 is further rotated in the direction of arrow B, the brush 170 again comes into contact with the electrode 164 and therefore, the states of the switches SWA and SWB become H, L as shown at d in FIG. 12, and when the setting dial 5 continues to be rotated, the states of the switches SWA and SWB again become L, L as shown at e(a) in FIG. 12. When the setting dial 5 is rotated in the opposite direction in the same manner, the states of the switches SWA and SWB change as shown in FIG. 13.

Accordingly, when both of the signals of input ports I1 and I0 corresponding to the switches SWA and SWB, respectively, are L, L it means a stable state in which the dial 5 is in the click as shown in FIGS. 12 and 13, and when the signals change to H, L, it can be judged that the setting dial 5 and the rotatable portion 162 have been operated in the direction of arrow B, and when conversely, the signals change to L, H, it can be judged that the setting dial 5 and the rotatable portion 162 have been operated in the direction of arrow C.

Such operation of the setting dial 5 is usually used to change the setting of the shutter speed or the aperture value, and is used for the selection of the distance measuring field when the distance measuring field selection mode button 8 (FIG. 7) is being depressed.

To select the distance measuring field, the distance measuring field selection mode button 8, shown in FIG. 7, is first depressed and the switch SW3 (FIG. 9) operatively associated therewith is closed. Thereby, the camera assumes the distance measuring field selection mode, and the selection of the distance measuring field becomes possible by the operation of the setting dial 5, i.e., the operations of the switches SWA and SWB.

That is, when the distance measuring distance selection mode button 8 is depressed, a signal MDS is given to the controller PRS by the closing of the switch SW3 (FIG. 9), and when in this state, the setting dial 5 is operated, signals I0 and I1 are given to the controller through the buffer circuit DCM, depending on the positions of the switches SWA and SWB (FIG. 9).

The controller PRS detects one-click operation of the setting dial 5 and the direction thereof and outputs to the motor driving circuit MDR3 a motor driving signal corresponding to the movement of the opening position of the movable mask 20 to the neighboring distance measuring field position.

In a 35 mm single-lens reflex camera, it is desirable in practical use to control the stepping motor 21 so as to move the movable mask 20 by the order of 1 mm each time it is detected that the setting dial 5 has been one-click-operated.

Figure 14:
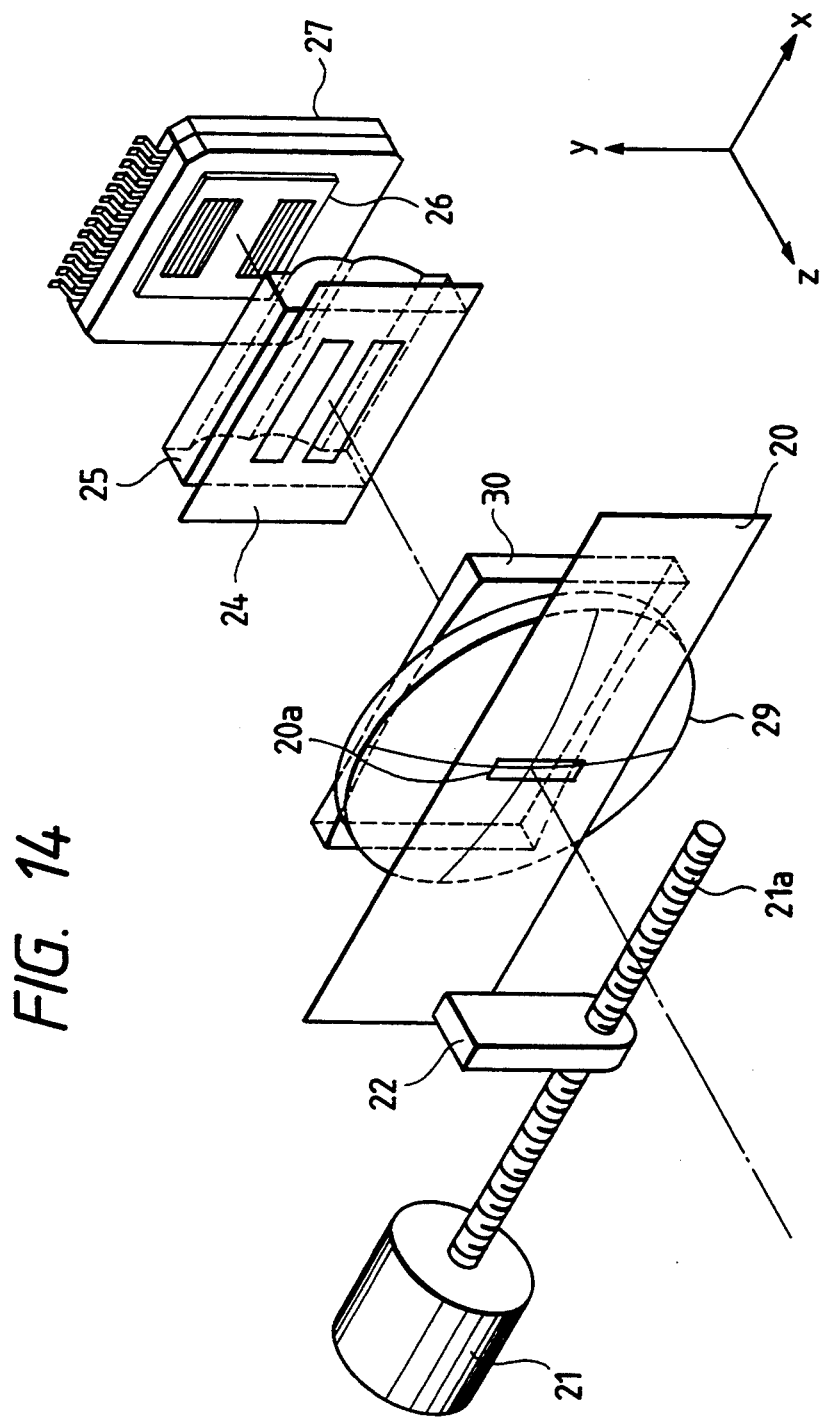
FIGS. 14 and 15 are perspective views of second and third embodiments, respectively, of the present invention.

FIG. 14 is a perspective view of the essential portions of a second embodiment of the present invention. In FIG. 14, the same elements as those shown in FIG. 2 are given the same reference numerals.

This embodiment differs from the first embodiment in that a spherical lens 29 and a cylindrical lens 30 are employed instead of the toric lens 23 of FIG. 2, and is the same as the first embodiment in the other points. That is, optical actions in x direction and y direction are made different from each other by the spherical lens 29 and the cylindrical lens 30. Thereby in yz plane (the vertical cross-section), the mask 24 and the exit pupil of the objective lens are made substantially conjugate with each other, and in xz plane (the transverse cross-section), the light receiving surface of the photoelectric conversion element 26 (the light receiving surface of the linear sensor) and the exit pupil of the objective lens are made substantially conjugate with each other.

Thus, as in the first embodiment, at whatever position in the photographing picture plane the opening 20a in the movable mask 20 may be, a light beam based on the object image enters the same area on the surface of the photoelectric conversion element 26, and focus detection at any position in the photographing picture plane, i.e., multipoint distance measurement, is possible even if the light receiving surface is of a small area.

Figure 15:
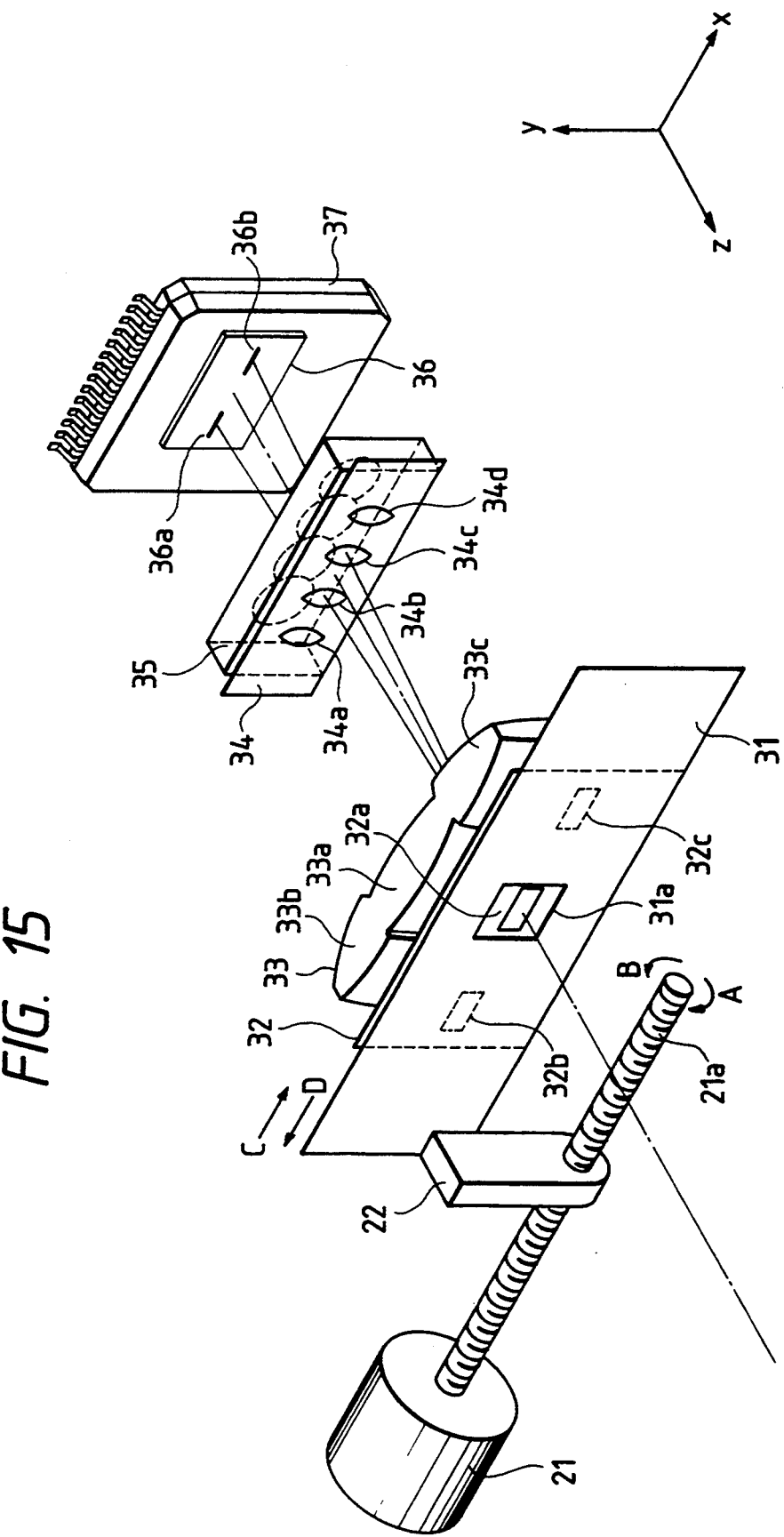

FIG. 15 is a perspective view of the essential portions of a third embodiment of the present invention, and FIGS. 16 and 17 are schematic views of the essential portions in the xz plane of FIG. 15.

In these figures, the reference numeral 31 designates a movable mask having an opening 31a extending in the x direction, and disposed near the predetermined imaging plane of the objective lens 1. One end portion of the movable mask 31 is secured by a support bar 22. The support bar 22 is formed with a female thread and is engaged with the lead screw 21a of a stepping motor 21. The movable mask 31 is parallel-moved in the x direction of arrow C (or D) by the driving of the stepping motor 21 in the direction of arrow A (or B).

Instead of moving the movable mask 31, design may be made such that a liquid crystal display plate is used and electrically changeable over so that the corresponding area thereof may become transparent.

The reference numeral 32 denotes a fixed mask having three slit-like openings 32a, 32b and 32c extending in x direction. The movable mask 31 assumes three positions corresponding to the three openings 32a–32c in the fixed mask 32. The fixed mask 32 may be formed with more than three openings, and in such case, the movable mask will assume positions corresponding to the number of the openings in the fixed mask. The reference numeral 33 designates an accumulation type field lens comprising three lenses 33a, 33b and 33c corresponding to the three openings 32a, 32b and 32c in the fixed mask 32. The reference characters 88a, 88b and 88c, shown in FIG. 7 denote the optical axes of the lenses 33a, 33b and 33c, respectively. The optical axes 88a–88c are parallel to one another.

The reference numeral 34 designates a multi-opening mask having four openings 34a–34d in the x direction. The reference numeral 35 denotes a re-imaging lens having four lenses 35a–35d corresponding to the four openings 34a–34d in the multi-opening mask 34. The reference numeral 37 designates light receiving means. The reference numeral 36 denotes a photoelectric conversion element comprising a pair of line sensors 36a and 36b each comprising a plurality of elements arranged in the x direction.

In the present embodiment, the movable mask 31, the fixed mask 32, the support bar 22 and the stepping motor 21 together constitute one element of mask means. The accumulation type field lens 33, the multi-opening mask 34 and the re-imaging lens 35 constitute the respective elements of optical means.

The action of each element will now be described with reference to FIGS. 16 and 17.

FIG. 16 is a view when the opening 31a in the movable mask 31 is on the optical axis of the objective lens 1. A light beam for focus detection passes through the opening 31a in the movable mask 31 and the opening 32a, as shown in FIG. 15, in the fixed mask 32, and thereafter enters the central lens portion 33a of the accumulation type field lens 33. This accumulation type field lens 33 in its central portion makes the multi-opening mask 34 and the exit pupil surface 28 of the objective lens 1 conjugate with each other, and particularly projects the centers of the two openings 34b and 34c in the multi-opening mask 34 onto the center of the exit pupil 28. Light beams passed through the openings 34b and 34c in the multi-opening mask 34 enter the lens portions 35b and 35c, respectively, of the re-imaging lens 35 disposed behind the multi-opening mask 34. The lens portions 35b and 35c of the re-imaging lens 35 make the predetermined imaging plane of the objective lens 1 and the light receiving surface of the photoelectric conversion element 36 conjugate with each other, and form the secondary images of a pair of object images on the light receiving surface of the photoelectric conversion element. A pair of line sensors 36a and 36b each comprising a number of picture elements are disposed on the photoelectric conversion element 36 on which the image of the opening 32a in the fixed mask 32 is formed by the re-imaging lens 35. The reversely projected images of these line sensors 36a and 36b provide a distance measuring field.

Said secondary images have their relative spacing changed in a direction indicated by arrow E in conformity with their imaged states relative to the predetermined imaging plane of the objective lens 1 and therefore, these are also photoelectrically converted and subjected to predetermined calculation, thereby finding the imaging state of the objective lens 1.

FIG. 17 is a view when the opening 31a in the movable mask 31 is at a position off the optical axis of the objective lens 1, and this figure corresponds to the case of multipoint distance measurement. A light beam for focus detection passes through the opening 31a in the movable mask 31 and the opening 32b in the fixed mask 32, whereafter it enters the marginal lens portion 33b of the accumulation type field lens 33.

The optical axis 88b of the marginal lens portion 33b of the accumulation type field lens 33 differs from the optical axis of the objective lens 1. The marginal lens portion 33b makes the multi-opening mask 34 and the exit pupil surface 28, of the objective lens 1, conjugate with each other and also projects the centers of the openings 34a and 34b in the multi-opening mask 34 onto the center of the exit pupil. Light beams passed through the openings 34a and 34b in the multi-opening mask 34 enter the lens portions 35a and 35b, respectively, of the re-imaging lens 35, and form the secondary images of the object on the surfaces, respectively, of the pair of line sensors 36a and 36b of the photoelectric conversion element 36.

As in the case of the on-axis distance measuring field shown in FIG. 16, the pair of secondary images are photoelectrically converted by the line sensors 36a and 36b, and predetermined calculation is effected on signals obtained at this time, thereby finding the imaging state of the objective lens 1 at an off-axis point.

The distance measuring system on the opening 32c side of the fixed mask 32 is symmetrical with respect to the optical axis and therefore need not be described.

Figure 18:
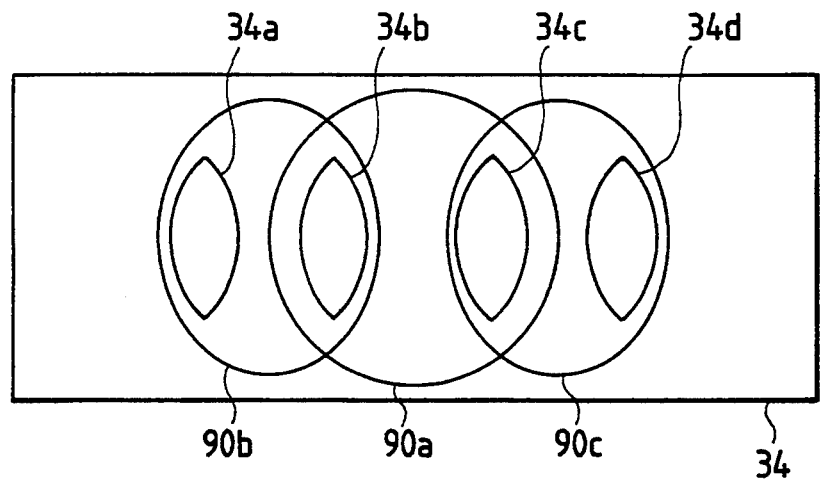
FIG. 18 is an illustration of portions of the FIG. 15 embodiment.
Figure 20:
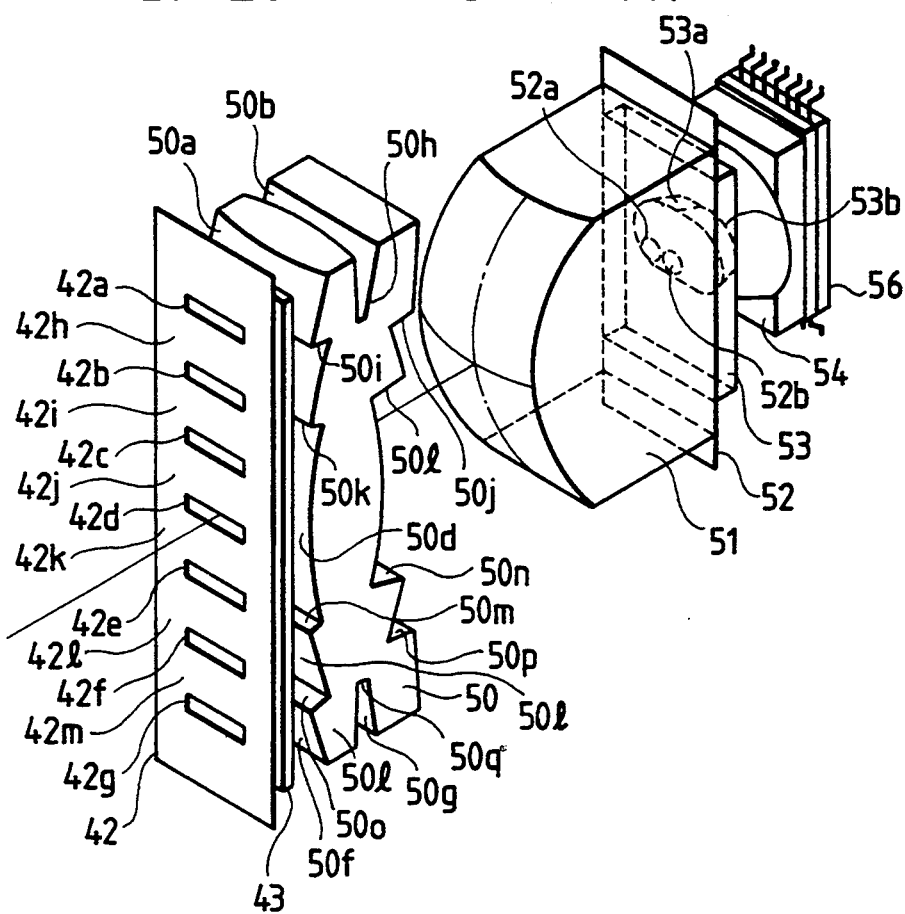
FIGS. 20 to 22 illustrate portions of a focus detecting apparatus according to the prior art.

FIG. 18 is an illustration of the multi-opening mask 34 in FIG. 15, and shows the positional relation thereof with the image of the exit pupil. In FIG. 18, the reference characters 90a, 90b and 90c designate the images of the exit pupil of the objective lens 1 by the central lens portion 33a and marginal lens portions 33b and 33c, respectively, of the accumulation type field lens 33. The openings 34b and 34c in the multi-opening mask 34 are set so as to be positioned in the exit pupil image 90a, the openings 34a and 34b in the multi-opening mask 34 are set so as to be positioned in the exit pupil image 90b, and the openings 34c and 34d in the multi-opening mask 34 are set so as to be positioned in the exit pupil image 90c. The openings 34b and 34c in the multi-opening mask 34 are in a common area of the two exit pupil images 90b and 90c, and the light beams from two distance measuring fields 32a and 32b selectively enter these depending on the position of the movable mask 31. By thus designing such that one opening in the mask 34 receives the light beams from two distance measuring fields, it becomes possible to make the sensor area small with the projection of the predetermined imaging plane of the objective lens 1 and the photoelectric conversion element 36 as reduced imaging, and yet direct the light beams from the plurality of openings (32a, 32b and 32c) in the fixed mask 32 onto the same picture element array of the line sensor.

In the present embodiment, the processing circuit for the output signal from the photoelectric conversion element 36 is the same as the embodiment shown in FIG. 9.

Figure 19:
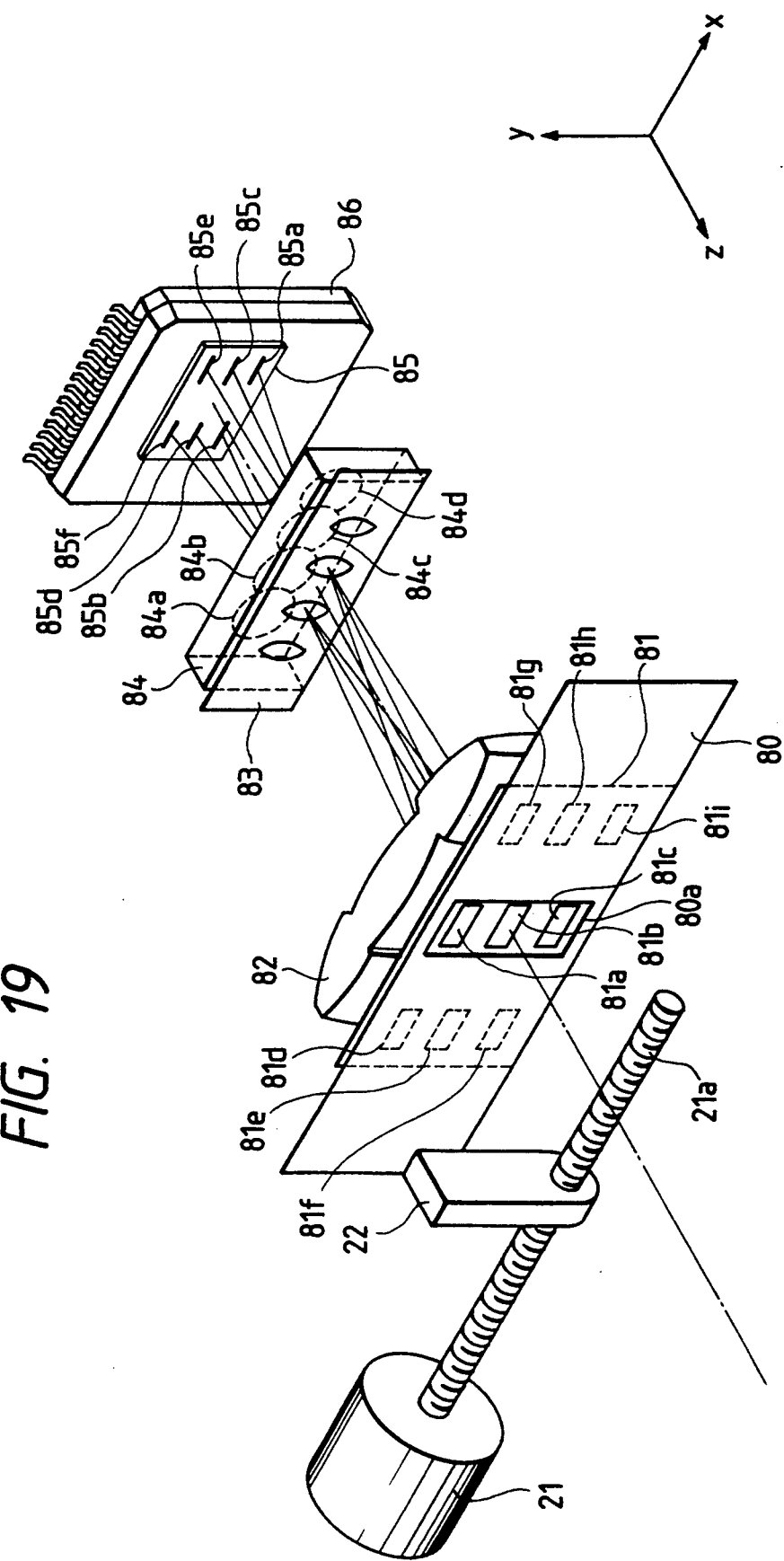
FIG. 19 is a perspective view of a fourth embodiment of the present invention.
Figure 21:
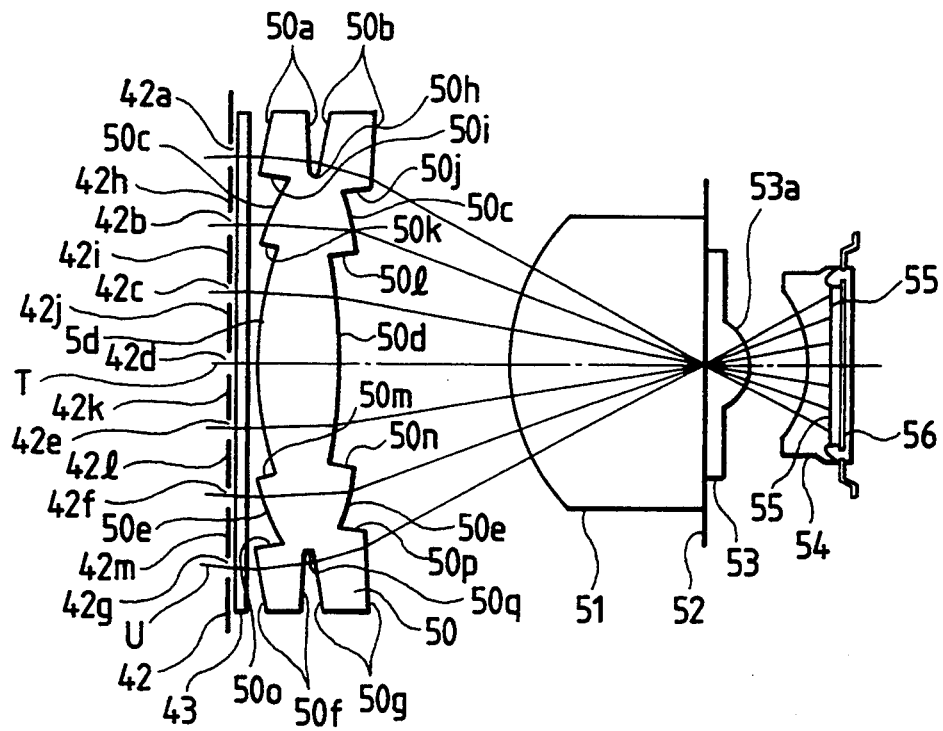
Figure 22:
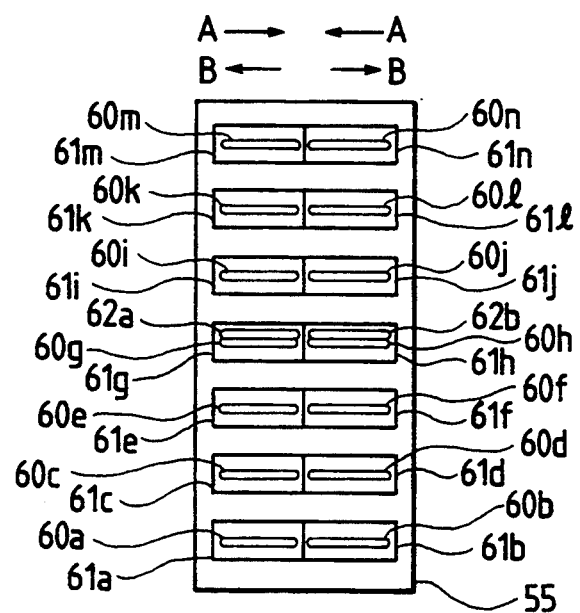

FIG. 19 is a perspective view of the essential portions of another embodiment of the present invention.

In this embodiment, the same elements as those in the embodiment of FIG. 15 are given the same reference characters.

In the present embodiment, as compared with the embodiment of FIG. 15, the number of distance measuring fields is increased in the vertical direction (y direction) so that in the whole of the photographing picture plane, distance measurement can be effected at nine locations. Therefore, a fixed mask 81 is formed with nine openings 81a–81i correspondingly to the distance measuring field positions. Also, three pairs of line sensors (line sensors 85a and 85b, line sensors 85c and 85d, line sensors 85e and 85f) are disposed on a photoelectric conversion element 85 constituting light receiving means 86.

Also, an opening 80a in a movable mask 80 is enlarged in the y direction, and is set to a size which includes three openings in a fixed mask 81 in the y direction. Three distance measuring fields function per one position of the movable mask 80. That is, in the position of the movable mask 80 shown in FIG. 19, by the optical actions of the two lens portions 84b and 84c of a re-imaging lens 84, the secondary images of the object image in the opening 81a in the fixed mask 81 are formed on the line sensors 85a and 85b, and likewise, the secondary images of the object image in the opening 81b are formed on the line sensors 85c and 85d, and the secondary images of the object image in the opening 81c are formed on the line sensors 85e and 85f. The reversely projected images of these line sensors provide the actual distance measuring fields.

In the present embodiment, as in the first embodiment, the relative spacing between the secondary images forming a pair is detected on the basis of the photoelectrically converted outputs thereof, whereby the imaging state of the objective lens 1 in each distance measuring field can be known.

Also, when the opening 80a in the movable mask 80 is at a position corresponding to the openings 81d, 81e and 81f in the fixed mask 81, by the actions of the two lens portions 84a and 84b of the re-imaging lens 84, the secondary images of the object image in the opening 81d in the fixed mask 81 are formed on the line sensors 85a and 85b, and likewise, the secondary images of the object image in the opening 81e are formed on the line sensors 85c and 85d, and the secondary images of the object image in the opening 81f are formed on the line sensors 85e and 85f. The openings 81g, 81h and 81i in the fixed mask 91 can be considered as optical axis symmetry in the same manner.

As described above, the line sensors 85a and 85b are used for focus detection at the positions of the openings 81d, 81a and 81g in the fixed mask 81, the line sensors 85c and 85d are used for focus detection at the positions of the openings 81e, 81b and 81h, and the line sensors 85e and 85f are used for focus detection at the positions of the openings 81f, 81c and 81i.

Thus, in the present embodiment, focus detection at nine positions in the photographing picture plane is effected by three pairs of line sensors.

In each of the above-described embodiments, the number of openings formed in the fixed mask is not limited, but may be arbitrary. In this case, the number of the lenses of the accumulation type field lens, the number of openings in the mask and the number of the lenses of the re-imaging lens can be determined in conformity with the number of openings in the fixed mask.

According to the present invention, there can be achieved a focus detecting apparatus in which from an object image formed by an objective lens, the constructions of optical means, masks, etc. for directing the distribution of quantity of light regarding the object image onto the surface of light receiving means are set as previously described, whereby distance measurement in a plurality of areas in the photographing picture plane is made possible by a pair of line sensors as the light receiving means.

What is claimed is:

1. A focus detecting apparatus comprising:
    optical means for forming, from a light beam passed through an objective lens, light intensity distributions whose relative positions vary in conformity with the focus adjusted state of the objective lens, wherein the variation of the angle of refraction of a portion of the light beam by said optical means along a direction in which the light intensity distributions vary differs from the variation of the angle of refraction along a direction perpendicular thereto;

light receiving means for receiving the light intensity distributions and forming a signal indicative of the focus adjusted state of the objective lens; and masking means for regulating the light beam passed through the objective lens to effect detection relative to a desirable position in a scene which is not restricted to a predetermined position.

2. A focus detecting apparatus according to claim 1, wherein said light receiving means is provided with a pair of picture element arrays.

3. A focus detecting apparatus according to claim 2, wherein each of said picture elements has a light receiving area extending in a direction orthogonal to the direction of arrangement thereof.

4. A focus detecting apparatus according to claim 1, wherein said masking means has a light intercepting plate constructed so that a slit-like opening can be formed at a desired location.

5. A focus detecting apparatus according to claim 4, wherein said masking means has a light intercepting plate movable in a predetermined direction and formed with a slit-like opening.

6. A focus detecting apparatus comprising:

light receiving means having a pair of sensors each comprising a plurality of picture elements arranged in a one-dimensional direction; and optical means disposed on an image plane side of an objective lens, for forming a plurality of light intensity distributions regarding an object image on a surface of said light receiving means by the use of light beams passed through different areas of the exit pupil of the objective lens, wherein a relative positional relation between the plurality of light intensity distributions is detected by said light receiving means and the in-focus state of the objective lens is found by the use of an output signal from said light receiving means, and wherein the variation of the angle of refraction of a portion of one of the light beams by said optical means along a direction in which the light intensity distributions vary differs from the variation of the angle of refraction along a direction perpendicular thereto, said optical means including a composite system comprising a first optical member and a second optical member, said first optical member being disposed near a predetermined imaging plane of the objective lens, and wherein a combination of said first optical member and said second optical member (i) sets, in a reference plane formed by the optical axis of the objective lens and in the direction of arrangement of the picture elements of said sensors, the predetermined imaging plane of said objective lens and the light receiving surface of said light receiving means so as to be optically substantially conjugate with each other, and (ii) sets, in a plane orthogonal to said reference plane, the exit pupil of the objective lens and the light receiving surface of the light receiving means so as to be optically substantially conjugate with each other.

7. A focus detecting apparatus according to claim 6, wherein a mask having a pair of opening therein is disposed between said first optical member and said light receiving means, and said first optical member, in said reference plane, makes the exit pupil surface of said objective lens and said mask optically conjugate with each other.

8. A focus detecting apparatus according to claim 6, wherein a movable mask having an opening therein and movable in a direction orthogonal to the direction of arrangement of the picture elements of said sensors is disposed near said predetermined imaging plane.

9. A focus detecting apparatus according to claim 6, wherein said first optical member has different refractive powers in said reference plane and in a plane orthogonal to said reference plane, and said second optical member has a refractive power only in said reference plane.

10. A camera apparatus comprising:

an objective optical system;

optical means for forming, for a light beam passed through said objective optical system, light intensity distributions whose relative positions vary in conformity with the focus adjusted state of the objective lens, wherein said optical means differs in refracting power between a direction in which the light intensity distributions vary and a direction perpendicular thereto;

light receiving means for receiving the light intensity distributions and forming a signal indicative of the focus adjusted state of the objective lens; and masking means for regulating the light beam passed through the objective lens to effect detection relative to a desirable position in a scene which is not restricted to a predetermined position.

11. A camera apparatus comprising:

an objective optical system;

light receiving means having a pair of sensors each comprising a plurality of picture elements arranged in a one-dimensional direction; and optical means disposed on an image plane side of said objective optical system, for forming a plurality of light intensity distributions regarding an object image on a surface of said light receiving means by the use of light beams passed through different areas of the exit pupil of the objective lens, wherein a relative positional relation between the plurality of light intensity distributions is detected by said light receiving means and the in-focus state of the objective lens is found by the use of an output signal from said light receiving means, and wherein said optical means differs in refracting power between a direction in which the light intensity distributions vary and a direction perpendicular thereto, said optical means including a composite system comprising a first optical member and a second optical member, said first optical member being disposed near a predetermined imaging plane of the objective lens, and wherein a combination of said first optical member and said second optical member (i) sets, in a reference plane formed by the optical axis of the objective lens and in the direction of arrangement of the picture elements of said sensors, the predetermined imaging plane of said objective lens and the light receiving surface of said light receiving means so as to be optically substantially conjugate with each other, and (ii) sets, in a plane orthogonal to said reference plane, the exit pupil of the objective lens and the light receiving surface of the light receiving means so as to be optically substantially conjugate with each other.

12. A focus detecting apparatus comprising:
an objective optical system;
optical means for forming, from a light beam passed through said objective optical system, light intensity distributions whose relative positions vary in conformity with the focus adjusted state of the objective lens, wherein said optical means differs in refracting power between a direction in which the light intensity distributions vary and a direction perpendicular thereto;
light receiving means for receiving the light intensity distributions and forming a signal indicative of the focus adjusted state of the objective lens; and
masking means for regulating the light beam passed through the objective lens to effect detection relative to a desirable position in a scene which is not restricted to a predetermined position.

13. A focus detecting apparatus comprising:
an objective optical system;
light receiving means having a pair of sensors each comprising a plurality of picture elements arranged in a one-dimensional direction; and
optical means disposed on an image plane side of said objective optical system, for forming a plurality of light intensity distributions regarding an object image on a surface of said light receiving means by the use of light beams passed through different areas of the exit pupil of the objective lens,
wherein a relative positional relation between the plurality of light intensity distributions is detected by said light receiving means and the in-focus state of the objective lens is found by the use of an output signal from said light receiving means,
and wherein said optical means differs in refracting power between a direction in which the light intensity distributions vary and a direction perpendicular thereto,
said optical means including a composite system comprising a first optical member and a second optical member, said first optical member being disposed near a predetermined imaging plane of the objective lens,
and wherein a combination of said first optical member and said second optical member (i) sets, in a reference plane formed by the optical axis of the objective lens and in the direction of arrangement of the picture elements of said sensors, the predetermined imaging plane of said objective lens and the light receiving surface of said light receiving means so as to be optically substantially conjugate with each other, and (ii) sets, in a plane orthogonal to said reference plane, the exit pupil of the objective lens and the light receiving surface of the light receiving means so as to be optically substantially conjugate with each other.

* * * * *

UNITED STATES PATENT AND TRADEMARK OFFICE
CERTIFICATE OF CORRECTION

PATENT NO. : 5,440,367
DATED : August 8, 1995
INVENTOR(S) : Yasuo Suda

It is certified that error appears in the above-indentified patent and that said Letters Patent is hereby corrected as shown below:

Title page, item [56] Foreign Patent Documents:
"1120518 5/1989 Japan
1154011 6/1989 Japan" should read
--1-120518 5/1989 Japan
1-154011 6/1989 Japan--.

Column 4,

Line 44, "a" should read --an--.

Column 8,

Line 64, "respective." should read --respectively.--

Column 11,

Line 68, "FIG. 7" should read --FIG. 17,--.

Column 15,

Line 68, "opening" should read --openings--.

Signed and Sealed this

Twelfth Day of December, 1995

Attest:

BRUCE LEHMAN

*Attesting Officer*  *Commissioner of Patents and Trademarks*